US008174399B1

(12) United States Patent
Farrow

(10) Patent No.: US 8,174,399 B1
(45) Date of Patent: May 8, 2012

(54) METHODS TO DETECT HAZARDOUS CONDITIONS IN A SAFETY GROUND CIRCUIT IN THE PRESENCE OF GROUND LOOP CURRENTS AND ELECTRICAL NOISE

(75) Inventor: John Foster Farrow, Plymouth, MI (US)

(73) Assignee: Welding Technology Corporation, Farmington Hills, MI (US)

( * ) Notice: Subject to any disclaimer, the term of this patent is extended or adjusted under 35 U.S.C. 154(b) by 325 days.

(21) Appl. No.: 12/437,574

(22) Filed: May 8, 2009

Related U.S. Application Data

(60) Provisional application No. 61/126,928, filed on May 9, 2008.

(51) Int. Cl.
G08B 21/00 (2006.01)
B23K 9/09 (2006.01)
(52) U.S. Cl. ........ 340/649; 340/650; 340/651; 340/661; 219/130.51
(58) Field of Classification Search .................. 340/635, 340/640, 649–657, 661–664; 219/130.32, 219/130.51, 132, 661; 361/42, 44
See application file for complete search history.

(56) References Cited

U.S. PATENT DOCUMENTS

| 3,934,176 | A | | 1/1976 | Vasudevan et al. |
| 3,938,006 | A | | 2/1976 | Gadwal et al. |
| 3,956,639 | A | | 5/1976 | Ramsay |
| 4,075,675 | A | | 2/1978 | Burkett et al. |
| 4,216,367 | A | * | 8/1980 | Risberg .................... 219/132 |
| 4,371,776 | A | * | 2/1983 | Winn .................... 219/130.51 |
| 5,083,117 | A | * | 1/1992 | Hoigaard .................. 340/649 |
| 5,157,236 | A | * | 10/1992 | Batzler et al. ......... 219/130.51 |
| 6,943,330 | B2 | * | 9/2005 | Ring .......................... 219/661 |
| 7,499,250 | B2 | * | 3/2009 | Zhang ......................... 361/42 |

* cited by examiner

Primary Examiner — Van T. Trieu
(74) Attorney, Agent, or Firm — John Foster Farrow

(57) ABSTRACT

The invention comprises a set of methods to detect the resistance of a connection to safety ground and to detect the presence of voltage hazardous to people in systems where an unknown amount of current intermittently flows in the safety ground circuit. Samples of voltage between two points in the safety ground circuit are taken repeatedly. When the voltage caused by the unknown currents in the safety ground circuit is below a preset threshold, a known current is applied and another voltage sample is taken to detect the electrical resistance of the safety ground circuit. If an excessive resistance or voltage is detected, one or more outputs are activated or deactivated to indicate the problem and remove power from the system. The invention requires no current sensor for its operation.

2 Claims, 4 Drawing Sheets

METHODS TO DETECT HAZARDOUS CONDITIONS IN A SAFETY GROUND CIRCUIT IN THE PRESENCE OF GROUND LOOP CURRENTS AND ELECTRICAL NOISE

CROSS REFERENCE TO RELATED APPLICATION

This application claims priority of U.S. Provisional Patent Application No. 61/126,928 filed on May 9, 2008 and titled "Method for Measuring Low Resistance Values in the Presence of Ground Loop Currents and Electrical Noise", the entirety of which is incorporated herein by reference.

BACKGROUND OF THE INVENTION

In art, this invention is believed to be in class 340, subclass 649.

Industrial machinery often has internal wiring and components which operate with high voltages that are dangerous to people. Protection is accomplished by covering the components where high voltage exists with electrical insulation and then enclosing the high voltage components with protective metal covers or cases. All of the exterior metal parts of the machinery are then connected directly to safety ground. If any of the insulation around the high voltage components deteriorates or is broken, and a current path from the high voltage to the surrounding metal exists, the connection to safety ground is capable of carrying enough current to open the fuses or circuit breaker supplying power to the system. This prevents high voltage from appearing on any exterior metal part of the machine, where a person could touch it.

To assure protection against electrical shock, it is necessary to constantly check the connection between safety ground and the machine containing high voltage. The usual way is with a low-ohm resistance measurement.

However, certain types of industrial machinery operate in a way which causes unknown amounts of current to intermittently flow in the safety ground circuit. This current in the safety ground circuit happens during normal operation and it is not practical to eliminate it. Although these unknown currents are almost always low enough to not create any safety issues, they do interfere with the measurement of the resistance between the machine and safety ground.

The invention is comprised of a set of methods together with apparatus to detect the resistance of a safety ground circuit and to assure that no voltage harmful to humans exists on the safety ground circuit or the devices which are connected to the safety ground circuit. If the resistance of the safety ground circuit rises above a predetermined value or a harmful voltage is found anywhere on the safety ground circuit or an attached device, outputs are provided to indicate an unsafe condition and to cause power to be removed from the devices which contain high voltage and are connected to the safety ground circuit.

The invention is distinguished from the prior art by the ability to detect the resistance of the safety ground circuit even if intermittent and unknown currents are flowing in the safety ground circuit. The invention is further distinguished from the prior art by the measurement of voltage potential to detect hazardous voltage all of the time, even when the intermittent and unknown currents make resistance detection impossible. The invention uses only simple switched DC for resistance detection and does not require any sort of external sensors to measure things like current or temperature.

The resistance of safety ground is normally in the range of 0.1 to 10 ohms. This is because the resistance path from any point of the grounded system back to safety ground must be capable of handling enough current to quickly cause the circuit protection device (fuse or circuit breaker) feeding power to whatever is enclosed by the grounded cabinet, housing, cover or case to open if a short-circuit between incoming power and the enclosure occurs. Otherwise, the incoming power voltage would appear for significant time in places that could be touched by people. In many industrial devices, the incoming power feed is at a voltage of approximately 500 volts and is fused at hundreds of amperes. Safety ground resistances no more than a few ohms are required.

Within a building, safety ground is ultimately earth ground. Earth ground is achieved by driving one or more metal grounding rods 1 meter or more into the ground to establish electrical contact with the underlying soil. In a building with a steel frame, where the steel supporting members contact the ground as part of the foundation structure, the grounding rods are connected to the steel frame of the building to improve the electrical connection to the underlying soil.

Inside the building, where machinery is installed, there is usually a separate conductor, made of copper or aluminum which is used only for safety ground connection. This safety ground conductor is usually routed to one or more grounding rods and is also connected to the steel frame (where present) of the building at many points throughout the building. The safety ground conductor carries no powerline current and is only tied to the neutral point of the incoming power at a single point. The purpose of the safety ground is to provide a place to connect the metal protective barriers (such as cabinets and housings) which surround high voltage components to earth ground.

In an industrial environment, there are many things which could cause the safety ground to become disconnected. Ground cables attached to moving machinery may break due to metal fatigue in the constantly-flexing cable. Moving machinery or fork lift trucks might snag on cables and break them. Ground cables may be disconnected during repair or maintenance. In places where corrosive vapors and/or moisture are present, corrosion at joining points may occur.

The goal of this invention is a simple, reliable means to detect a broken safety ground connection where an apparatus connected to safety ground may cause an intermittent and unknown current, sufficient to disrupt a resistance measurement, to flow in the safety ground circuit.

BRIEF DESCRIPTION OF THE DRAWINGS

All of the blocks in the flowcharts of FIGS. 3 and 4 are numbered. Where a block is identical in both figures, it carries the same number.

DETAILED DESCRIPTION OF THE PREFERRED EMBODIMENT

In order to illustrate the features of this invention, a resistance spotwelding gun is used. However, the inventive concept is useful with any type of equipment that may cause intermittent and unknown currents to flow in a safety ground circuit.

The resistance spotwelding process is often used to weld two or more pieces of relatively thin sheet steel together. In the spotwelding process, two copper electrodes, about the size and shape of a man's thumbs, are placed end to end on opposing sides of the sheet steel. These electrodes are normally hollow and are cooled by circulating water. The two electrodes are driven toward each other with a force of about 500 pounds, thus clamping the sheet steel between them. A large heating current, about 10,000 amperes at a low voltage (less than 10 volts) is passed between the electrodes, through the sheet steel for typically ¼ second. The steel immediately between the welding electrodes is heated quickly to the temperature which causes it to soften. The force applied by the welding electrodes forges the softened steel into a homogeneous mass to form the actual weld. As soon as the current stops, the copper electrodes, being water cooled and excellent conductors of heat, rapidly cool the steel and cause it to solidify. A spotweld to join two pieces of sheet steel 1 mm each in thickness is normally done in 1 second or less. For more details on the resistance welding process, please see U.S. Pat. No. 4,447,700, particularly FIG. 1, incorporated herein by reference.

The spotwelding process is often done with an integral transformer welding gun. For a detailed description of the appearance and construction of an integral transformer resistance spotwelding gun, please see U.S. Pat. No. 6,455,800, especially FIG. 1 of that patent, incorporated herein by reference.

The spotwelding gun is normally moved to different positions around the part, to make the welds where needed. The spotwelding gun is moved by a person, a robot or other automated means. Because the spotwelding gun is moved around, any cables connected to it are flexible and are not enclosed for protection in a rigid steel conduit pipe. However, because of the welding transformer which is built-in to the welding gun, where the primary of that transformer is operated at voltages between 400 and 800 volts, grounding of the integral transformer welding gun is very important for safety. It becomes very important to have a way to assure the integrity of the grounding cable to protect a human who might be touching or operating of the welding gun.

Figure 1:
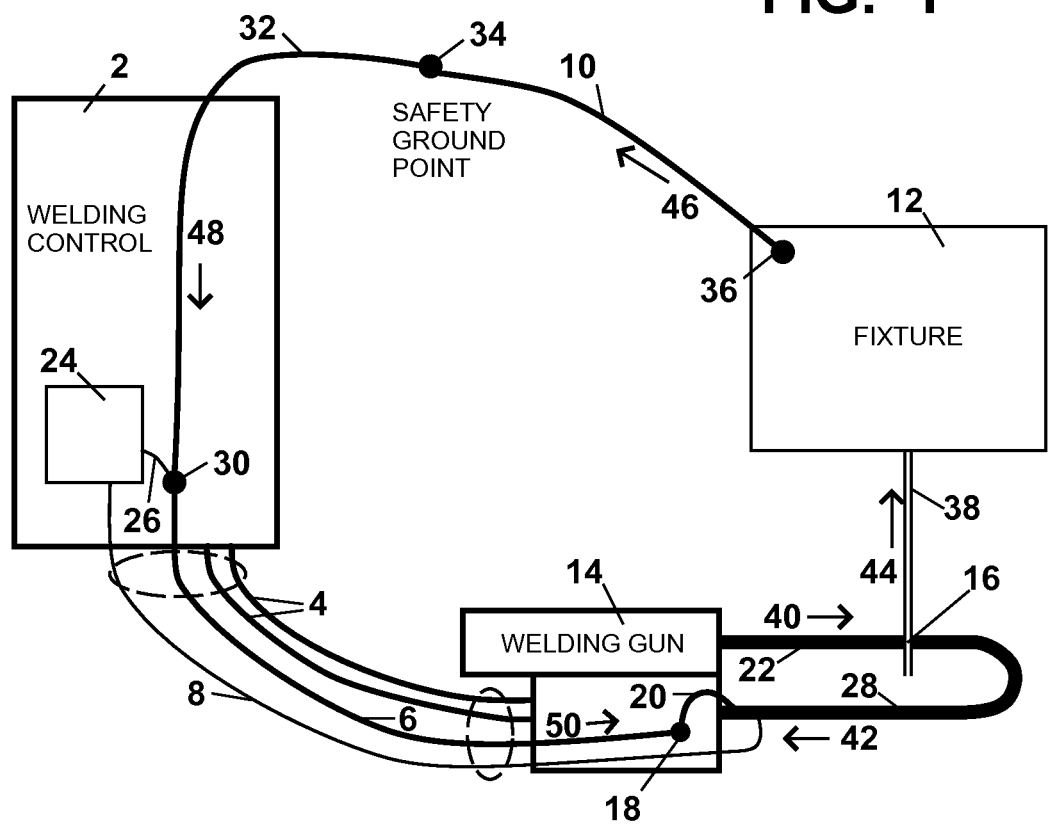
FIG. 1 shows, schematically, an example safety ground circuit in a system which includes a resistance welding control, an integral transformer resistance spotwelding gun and a fixture to hold the part which is to be welded.

FIG. 1 illustrates schematically an integral transformer resistance spotwelding gun making a weld on a part which is held in a fixture. The three major components of FIG. 1 are the welding control 2, the welding gun 14 and the fixture 12.

The safety ground point, item 34 in FIG. 1, is the connection point for safety ground for the entire system shown in FIG. 1. The safety ground point is a terminal of some sort where direct connection can be made to the safety ground conductor for the building. In a typical installation in a building with a steel frame, the safety ground point 34 is a bolt or stud which is rigidly attached, by welding or otherwise, to a structural member of the building, such as a steel supporting column. The safety ground conductor for the building (not shown in FIG. 1) is brought to point 34 along with conductors 10 and 32. All three conductors are securely connected together with each other and with the steel frame of the building, by bolting or otherwise, at ground point 34.

Conductor 32 in FIG. 1 goes from the safety ground point 34 to ground connection point 30 located inside the weld control cabinet 2. Ground connection point 30 is securely connected, via welding or other means, to the metal of the welding control cabinet.

In most cases there are several redundant paths, in addition to conductor 32 in FIG. 1, to connect the metal cabinet of welding control 2 to safety ground. In most factories, multiple welding controls are grouped together and mounted to the same frame, bracket, or automation machine, which is usually made of steel. Each welding control is connected to safety ground point 34, each with a separate conductor. Within a group of welding controls, even if one conductor 32 on one of the welding controls becomes disconnected, connection to ground is still maintained through the mounting bolts which hold the welding controls to their common mounting bracket. In addition, it is common practice to weld or bolt the mounting brackets for welding controls to a steel building support column (almost all industrial buildings have steel frames), so this forms another redundant connection to safety ground.

Conductor 10 in FIG. 1 goes from the safety ground point 34 to connection point 36 located in or on Fixture 12 which is holding the part to be welded 38. Connection point 36 is securely connected, via welding or other means, to the metal frame of fixture 12. Because the part being welded 38 is rigidly clamped into fixture 12, by means which do not include any electrical insulation, it is in good electrical contact with the frame of fixture 12 and thus with safety ground.

As shown in FIG. 1, there is a multi-conductor cable which runs between weld control 2 and welding gun 14. The two dotted-line ovals, located near welding control 2 and welding gun 14 encircle the conductors which are included in this cable. There are three main conductors in the cable connecting the integral transformer welding gun 14 to the welding control 2. These main conductors are sized to carry several hundred amperes. Two of these main conductors, identified as item 4 in FIG. 2, carry the high voltage power to the primary of the welding transformer. The voltage on these power conductors is normally in the 400 to 800 volt range. The third main conductor, identified as item 6 in FIG. 1 is the safety ground connection between the safety ground point in the welding control and the welding gun. At the welding gun end of the cable, the safety ground is connected to grounding point 18, which is usually a threaded hole in the metal case of the welding transformer. The welding transformer itself is securely bolted to the frame of the welding gun.

In addition to the three main conductors, the cable between the welding control and the welding gun contains at least one pilot wire, identified as item 8 in FIG. 1. The pilot wire is a relatively small insulated wire, 14 gauge or smaller. This pilot wire is used by apparatus 24 to detect the resistance of the safety ground circuit between welding gun 14 and the safety ground connection 30, located inside the welding control cabinet. In an assembled integral transformer welding gun, depicted schematically in FIG. 1, the circuit created by the secondary of the welding transformer, the arms 22 and 28 of the welding gun, the welding electrodes and the part which is clamped between them, is referred to as the secondary circuit of the welding gun. The current necessary to make the weld flows through the secondary circuit of the welding gun.

On the welding gun itself, a connection must be made directly between the secondary circuit of the welding gun and ground point 18 on the case of the welding transformer. The conductor for this connection is identified as 20 in FIG. 1. The secondary circuit of the welding gun must be connected to safety ground because the most common failure of a welding transformer is insulation failure between the primary and secondary windings of the transformer. Since the primary of the welding transformer operates at 400 to 800 volts and the secondary of the transformer is connected directly to the arms of the welding gun which are made of large, exposed, uninsulated copper parts which can easily be touched by a person, a good connection to safety ground is essential to provide protection from electrical shock. Conductor 20 in FIG. 1 is of similar size to the main ground conductor 6 in the cable feeding power to the welding gun. Depending on the mechanical details of the transformer and welding gun, conductor 20 is attached by bolting, welding or other means between either the transformer secondary itself or one arm of the welding gun and ground point 18 on the transformer case.

As shown on welding gun 14 in FIG. 1, pilot wire 8 is connected to a point on the secondary circuit separate from the point where conductor 20 is connected. This is done to assure that conductor 20 and pilot wire 8 can't get disconnected from the welding gun secondary circuit but remain connected to each other.

In FIG. 1, the part being welded 38 usually doesn't move during the welding process. The two or more individual pieces of stamped sheet metal which are welded together to make a finished part are tightly clamped and held in the correct positions in relation to each other by fixture 12, usually made of steel. Fixture 12 is connected to safety ground via conductor 10.

The problems which this invention addresses can be understood by looking at the current flow in the secondary circuit of welding gun 14 in FIG. 1. The normal flow of current to make a weld at point 16 is shown with arrows 40 and 42. The current flow is through the upper arm 22 of welding gun 14, through the weld at point 16 and then back to the welding gun through its lower arm 28.

From the standpoint of welding current in the secondary circuit of the welding gun, there are two possible paths to complete the circuit. As shown in FIG. 1, one path is directly through the area to be welded 16, as illustrated by arrows 40 and 42. The other path is through the part to the fixture, illustrated by arrow 44, then through the grounding conductors 10, 32 and 6, illustrated by arrows 46 and 48, then back to the secondary of the secondary circuit of the welding gun as illustrated by arrow 50.

In operation to make a spotweld, the current 40 in FIG. 1 divides along the two paths according to the relative resistances of the two circuits. For example, the electrical resistance of a resistance spotweld in steel is approximately 0.0002 ohms. The resistance of the part being welded 38 plus the ground conductors in the current path indicated by arrows 44, 46, 48 and 50 is approximately 1 ohm. Thus if current 40 is 10,000 amperes, current 42 (current through the lower arm of the welding gun) will be:

$$1\ ohm/(1\ ohm+0.0002\ ohm)=9{,}998\ amperes$$

and current 44 (current in the ground circuit) will be:

$$0.0002\ ohm/(1\ ohm+0.0002\ ohm)=2\ amperes$$

Current 44 in FIG. 1, flowing in the ground circuit, is sometimes called ground loop current.

However, the resistance of the material being welded 38 in area 16 of FIG. 1 is not a constant value. It normally changes as a weld is being made. In normal welding conditions, the resistance of the weld area 16 varies by a factor of up to three above and below the "nominal" value of 0.0002 ohms as the welding current heats the part and the force applied by the welding electrodes forges the metal to create the weld. In addition, abnormal welding conditions, such as (but not limited to) misshaped parts, rust, dirt or a misplaced paper label on the part can make the resistance in the weld area 16 any value up to infinity. Because the resistance of the weld area 16 is unpredictable, the way current 40 divides into currents 42 and 44 in FIG. 1 will also be unpredictable.

The current flowing in the safety ground circuit is also affected by the magnetic field surrounding the 10,000 amperes or more of welding current in the weld area. Depending on how ground cables 6 and 10 of FIG. 1 are positioned in relation to this strong magnetic field, the magnetic field can induce currents of several amperes in the ground cable.

The current flowing in the safety ground circuit is also affected by other welders, especially arc welders, which may be welding on the same part at the same time as the spotwelding operation. If the arc welding machine is not properly grounded to the part (usually through the fixture holding it), some of arc welding current may flow back through the secondary of the spotwelding gun and then through safety ground cable 6 in FIG. 1, thus causing an unknown current in the ground conductor.

Also, arc welding creates high-frequency currents. Because of the unavoidable inductance of the grounding cables (because of their length), this high-frequency current causes voltage drops across the grounding cables, which causes high-frequency noise to be injected into the safety ground circuit.

All of the above-mentioned factors plus others could cause an unknown current to flow through the safety ground cable at any time, even when not welding. Trying to detect the resistance of a cable while it is carrying an unknown current is impossible. The object of the invention is one or more methods to overcome this difficulty and provide increased safety.

The apparatus used to implement the method of the invention is shown as 24 in FIG. 1. In this example, apparatus 24 is located inside welding control 2, but it could be located in other places as well. Apparatus 24 has two connections to detect the resistance between ground point 30 inside weld control 2 and the secondary circuit of welding gun 14. Conductor 26 connects between apparatus 24 and ground point 30. Pilot wire 8 connects between apparatus 24 and the secondary circuit of welding gun 14. As mentioned previously, pilot wire 8 connects to the secondary circuit of welding gun 14 at a different point than the connection of grounding conductor 20. In operation, apparatus 24 detects the resistance of the circuit between pilot wire 8 and connection 26, which includes ground conductors 6 and 20. When the welding gun is closed on the part 38, the resistance will also include the circuit through part 38, weld fixture 12, conductor 10 and conductor 32, as indicated by arrows 44, 46 and 48. If a loose or broken connection happens anywhere in this circuit, the detected resistance will rise and the problem will be detected.

Figure 2:
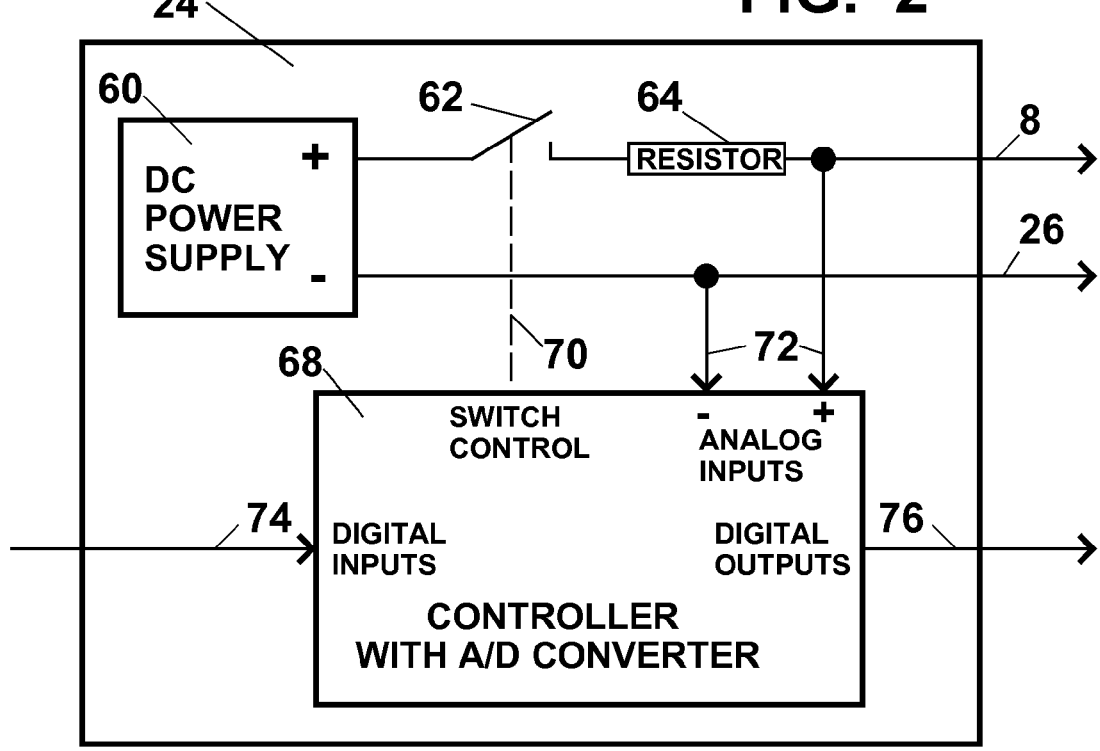
FIG. 2 illustrates the apparatus used to perform the methods of the invention.

FIG. 2 illustrates the internal circuitry of apparatus 24. As shown in FIG. 2, the major components of apparatus 24 are a DC power supply 60, a switch 62, a resistor 64 and a controller 68.

Referring to FIG. 2, the positive output of power supply 60 connects through switch 62 and resistor 64 to pilot wire 8. The negative output of the power supply 60 in FIG. 2 connects to conductor 26, which connects to ground point 30 in FIG. 1.

In the preferred embodiment, switch 62 in FIG. 2 is implemented with a bipolar transistor which has a voltage drop of about 0.25 volts. DC power supply 60 has a regulated voltage output of 12.25 VDC at approximately ½ amp and resistor 64 has a value of 20 ohms. The net effect of the circuitry of the preferred embodiment is to inject a known current when switch 62 is closed, with a source voltage of 12 VDC and a 20 ohm series resistor into the safety ground circuit. In the presence of this known current, the safety ground circuit resistance can be detected with a voltage measurement between conductors 8 and 26. Other power supply voltages, power supply polarities, switch implementations and series resistor values can be used without departing from the inventive concept.

The point of switch 62 in FIG. 2 is that the actions to detect the resistance of the safety ground circuit are not done continuously. Rather, the actions to detect resistance, by turning switch 62 on and measuring the resulting voltage across conductors 8 and 26 are done only after some other conditions are met. In normal operation, switch 62 is closed only for brief intervals.

In FIG. 2, controller 68 is equipped with an output 70 to control switch 62, differential analog inputs 72 to read the voltage between conductors 8 and 26, digital inputs 74 and digital outputs 76.

Controller 68 in FIG. 2 is a digital device that can be implemented with discrete logic, a stored program microcomputer or other ways. Controller 68 could also be only a portion of a stored program microcomputer, which is also used for other purposes completely unrelated to measurement of safety ground circuit resistance. Since the details of implementation of controller 68 are not an object of this invention, controller 68 will be treated as a "Black Box" in this discussion; only the external behavior, not the inner workings, of controller 68 will be discussed.

Switch 62 in FIG. 2 can be any sort of switch suitable for the purpose, such as an electromechanical relay or a transistor. In the preferred embodiment, output 70 of controller 68 is used to turn a transistor ON and OFF so that the transistor continuously cycles ON for $1/16^{th}$ of a second and OFF for $15/16^{th}$ of a second. Analog inputs 72 are used to take samples of the voltage across conductors 8 and 26 at the rate of about 2000 samples per second. During the time that switch 62 is turned ON to inject a known current into the safety ground circuit, the measured voltage is used to detect the resistance of the circuit between conductors 8 and 26. At times when switch 62 is OFF, the voltage measured by analog inputs 72 between conductors 8 and 26 is compared to several different upper and lower limits; different actions are taken depending on the voltage found.

Digital outputs 76 of controller 68 in FIG. 2 are used for user interface; to drive indicator lights, and for controlling an external device to remove power from welding gun 14 in FIG. 1 if excessive resistance or voltage is detected in the safety ground circuit.

Digital inputs 74 of controller 68 in FIG. 2 are used for user interface, such as pushbuttons or switches to select operating parameters or to reset error conditions. Digital inputs 74 can also be used to detect when the external device used to disconnect power from welding gun 14 of FIG. 1 has operated properly.

The digital inputs and outputs at 74 and 76 respectively in FIG. 2, can be implemented in many different ways. In the preferred embodiment, described herein, these inputs and outputs are discrete and are used to turn on indicator lights, detect the status of switch inputs and directly control external devices to do such things as shut off power to a machine. However they could also be implemented in other ways, perhaps (but not by limitation) with a computer interface, such as an RS-232 serial port. In the situation where controller 68 of FIG. 2 is implemented by software in a microcomputer which also does other things, inputs 74 and outputs 76 could simply be bits in the microcomputer memory, which are read or set by other software routines. Since the details of implementation of digital inputs 74 and digital outputs 76 are not an object of this invention, no further description is given herein.

Figure 3:
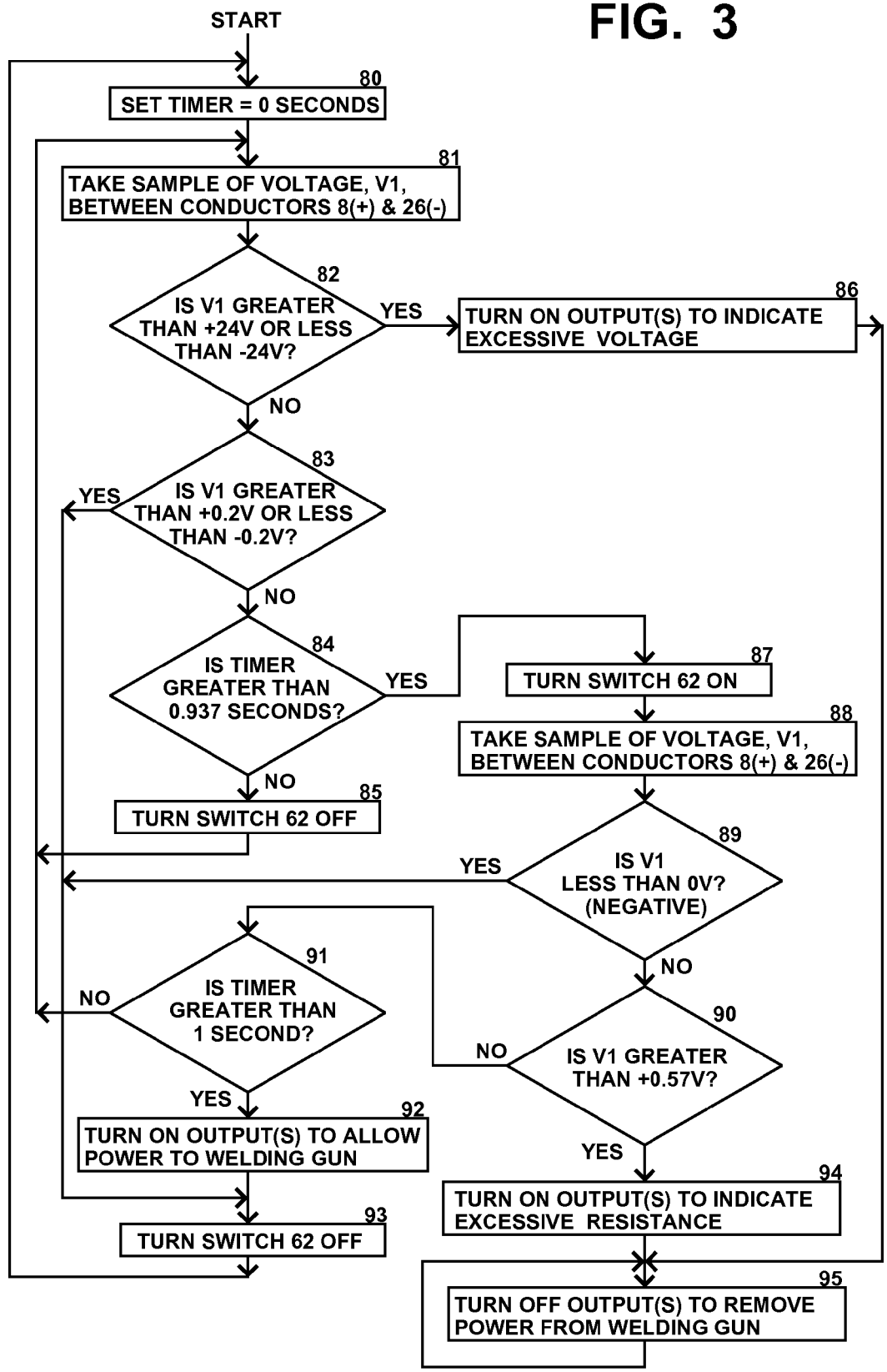
FIG. 3 is a flowchart which shows the operation of the apparatus in FIG. 2, when it is performing the methods of the invention to detect hazards in the safety ground circuit in the system illustrated in FIG. 1.

The operation of apparatus 24, shown in FIG. 2 may be understood with the use of the flowchart in FIG. 3. All of the blocks of the flowchart are identified by numbers near the upper right corner of each block. The START position of the flowchart represents the power-up or initialization state of the apparatus. In the power-up or initialization state, all of the outputs 76 of FIG. 2 are OFF, including the ones which allow power to welding gun 14 of FIG. 1.

In the flowchart of FIG. 3, the variable "V1" represents the digital number resulting from a voltage sample taken between conductors 8 and 26.

The voltage between conductors 8 and 26 is applied to the differential analog inputs 72 of controller 68 in FIG. 3. The voltage across analog inputs 72 is sampled at discrete times and converted to a digital number, V1, by an A/D converter which is built-in to controller 68. The voltage samples are taken differentially with conductor 8 as the positive input and conductor 26 as the negative input. If the voltage at conductor 8 is positive with respect to conductor 26, the digital number which represents the sampled voltage, V1, is positive. If the voltage at conductor 8 is negative with respect to conductor 26, the digital number, V1, is negative. In FIG. 3, flowchart blocks 81 and 88, this polarity is indicated by the (+) and (−) following the conductor numbers.

In the preferred embodiment, things work on a 1-second time cycle, but there is nothing in the inventive concept which requires a particular timing. In the flowchart of FIG. 3, a timer is used to keep track of time within each one second block of time. For the first 0.937 seconds ($15/16$ths of the interval) switch 62 of FIG. 2 is turned OFF and the voltage between conductors 8 and 26 is sampled multiple times. In the preferred embodiment, samples are taken about once every 500 microseconds (2000 times per second), but almost any other sampling rate could be used. The only limit on the voltage sampling rate is on the low end; this device is, after all, a safety device to protect a person from electric shock. If a too-high resistance or a hazardous voltage is present, the sampling rate needs to be fast enough to detect the condition quickly, so reaction can be done quick enough to prevent injury.

During the first $15/16^{th}$ of the second, the voltage sample V1 obtained in block 81 of FIG. 3 is compared to two different thresholds and two different actions are taken as a result.

If the sampled voltage, V1, has an amplitude whose absolute value is greater than 24 volts (block 82 in FIG. 3), then the appropriate output(s) 76 are turned-on to indicate excessive voltage and actions are taken to remove power from the welding gun. The voltage of 24 volts is selected because most regulatory agencies consider voltages below 24 volts as not hazardous to humans. However, nothing in the inventive concept limits this voltage to any particular value.

In block 83 of FIG. 3, if the sampled voltage, V1, is above +0.2 volts or below −0.2 volts then switch 62, shown in FIG. 2 is turned OFF (block 92) and the 1-second timer is set back to zero (block 80). This defers the actions to detect if the resistance of the safety ground circuit is above a preset limit until the voltage resulting from an unknown current in the safety ground circuit is within the limits of +/−0.2 volts.

The voltage of +/−0.2 volts used in block 83 of FIG. 3 is selected according to the apparatus of FIG. 2 and the requirements of the resistance detection of the safety ground circuit. Referring to FIG. 2, when power supply 60 supplies 12 volts, switch 62 is closed, resistor 64 is 20 ohms, and the maximum allowable resistance of safety ground is 1 ohm, then the expected maximum voltage reading between conductors 8 and 26 is 0.57 volts. Thus, any unknown current which produces a voltage which is a significant fraction of 0.57 volts across conductors 8 and 26 in FIGS. 3 and 4 will cause significant errors in the measurement. If a more accurate detection is needed or the maximum allowable resistance is different than 1 ohm, then the voltage thresholds in block 83 of FIG. 3 may be a different value. The value of the voltage thresholds in block 83 of FIG. 3 are selected according to the requirements of the application and are not limited by anything in the inventive concept.

If nothing causes the timer to reset to zero, then at times greater than 0.937 seconds (block 84), switch 62 is turned on (block 87), and the voltage V1 between conductors 8 and 26 is sampled (block 88) for the resistance determination.

Because the current injected for the resistance reading is positive in polarity, the resulting V1 sample should also be a positive value. V1 is checked to be sure it is not a negative value in block 89 of FIG. 3. If a negative value is found, it indicates that there is an unknown current in the safety ground circuit that is interfering with a resistance measurement. In response, switch 62 is turned OFF in block 92, the timer is reset to zero, and the resistance checks are deferred until the unknown current goes away.

During each one second time interval, the resistance checks are only done during the final 0.063 second ($\frac{1}{16}^{th}$ second) of the one second interval. At all other times, voltage measurements are done both to detect hazardous voltages and to detect the presence of voltage resulting from unknown currents in the safety ground circuit sufficient to disrupt the resistance detection.

In block 90 of FIG. 3, the sampled voltage, V1, is compared with the value (+0.57 volts) which corresponds to 1 ohm. Depending on the requirements of the overall safety system, this comparison can either be single or it can be averaged or it can be with a time delay. For example, the comparison could be done with the average value of V1 obtained over a time interval of several seconds. In another example, there is a time delay associated with the comparison so that V1 must be greater or less than 0.57 volts for a stated period of time, perhaps for several seconds. Since this invention is not directed to methods of averaging voltage readings or using time delays in comparisons of them, no further discussion is given herein.

If the voltage sample, V1 is found to be greater than 0.57 volts in block 90 of FIG. 3, which corresponds to 1 ohm between conductors 8 and 26, the appropriate outputs are turned ON or OFF in blocks 93 and 94 to indicate the problem and shut power off to the welding gun. As the flowchart indicates, once power is removed from the welding gun, the inventive apparatus is designed to keep power off to the welding gun indefinitely, until the apparatus is reinitialized (thereby returning it to the START position of the flowchart) or is powered-down.

Figure 4:
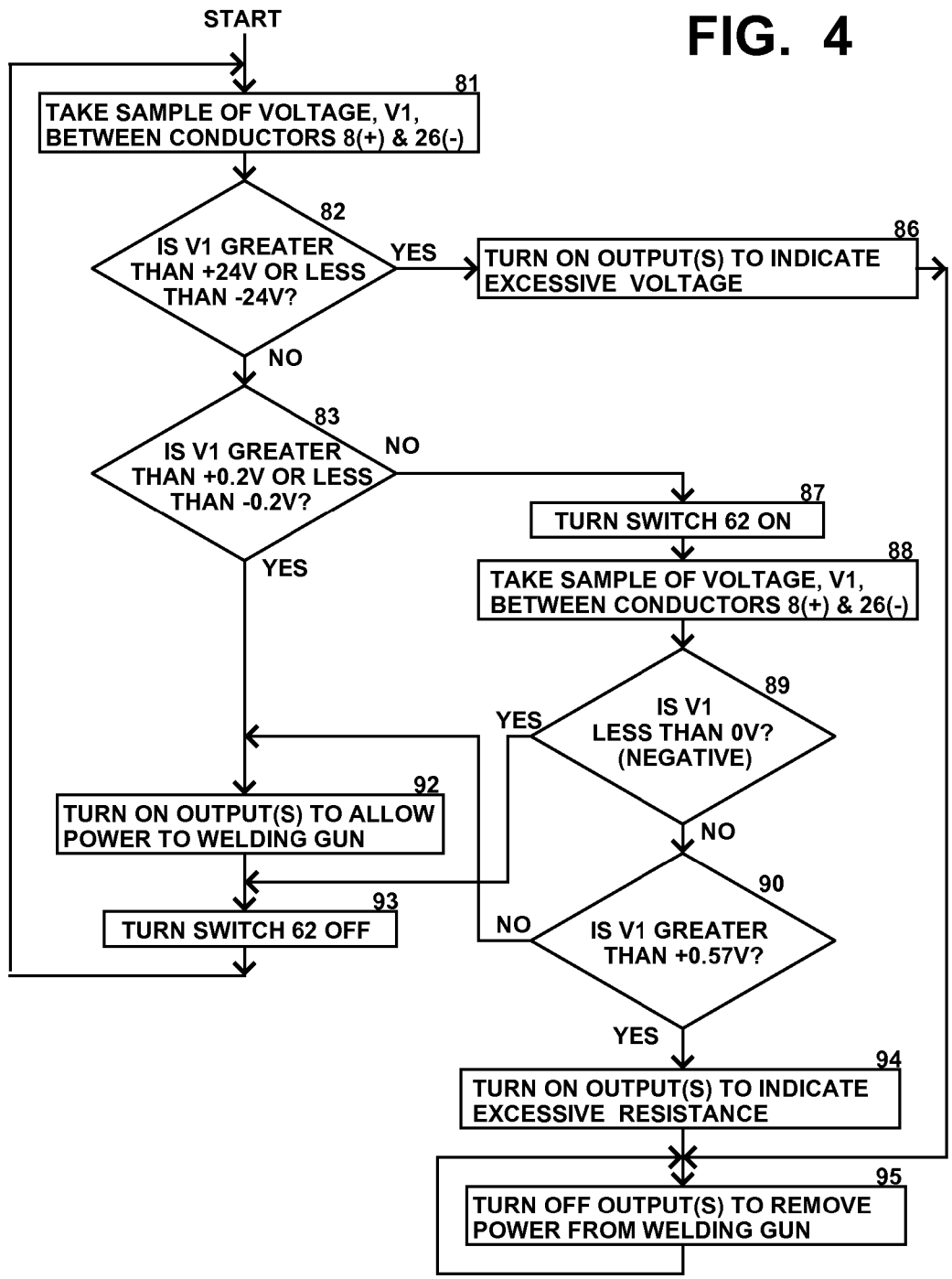
FIG. 4 shows a simplification of the flowchart in FIG. 3, where no specific timing is used, but the functions remain the same.

For illustrative purposes, the flowchart of FIG. 3 shows specific time values and voltage values which correspond to the preferred embodiment. However, the invention does not require any specific values and any use of specific values herein should be taken as examples of the invention, not limitations of it. For example, the invention could be practiced without any specific time intervals at all. If the voltage sample V1 is found to be below a certain threshold as in block 83 of FIG. 3, then switch 62 of FIG. 2 would immediately be turned on and another voltage sample taken to determine the resistance of the safety ground circuit. Such operation is illustrated in the flowchart of FIG. 4. Except for the removal of the blocks related to timing, and other blocks made redundant by that, the functions in the flowchart of FIG. 4 are the same as FIG. 3. Since the flowchart blocks in FIG. 4 are a proper subset of FIG. 3, their numbering is the same.

While the inventive methods have been illustrated herein by specific examples within a preferred embodiment, it is to be understood that the inventive methods are far broader, with many possible variations, with many possible applications, and are limited only by the appended claims.

I claim:

1. In a safety ground circuit with unknown amounts of current flowing in it at some, but not all times, a method to detect that the resistance between two preselected points in the safety ground circuit is above one or more preselected maximum values which includes the steps of:
   a. obtaining one or more samples of voltage between the two preselected points,
   b. comparing the voltage sample(s) to one or more sets of upper and lower limit values,
   c. injecting a known current and taking measure of the resistance only if all the voltage samples are within the limit values,
   d. comparing the measured resistance value to one or more preselected maximum values, and
   e. activating or deactivating one or more outputs in response to the comparison.

2. In a safety ground circuit with unknown amounts of current flowing in it at some, but not all times, a method to detect that the resistance between two preselected points in the safety ground circuit is above one or more preselected values which includes the steps of:
   a. obtaining one or more samples of voltage between the two preselected points,
   b. comparing the voltage sample(s) to one or more sets of upper and lower limit values,
   c. injecting a known current and taking measure of the resistance only if all the voltage samples are within the limit values, and
   d. disregarding the measure of resistance if the voltage measurement taken to obtain the resistance value is of a polarity opposite to the known current.

* * * * *